July 30, 1963 R. L. FRANK 3,099,795

PHASE CODED COMMUNICATION SYSTEM

Filed April 3, 1957

| PULSE NO. | 1 | 2 | 3 | 4 ••• | X ••• | N |
|---|---|---|---|---|---|---|
| GROUP NO. | | | | | | |
| 1 | 1 | 2 | 3 | 4 ••• | • ••• | N |
| 2 | 2 | 4 | 6 | 8 ••• | • ••• | 2N |
| 3 | 3 | 6 | 9 | 12 ••• | • ••• | 3N |
| 4 | 4 | 8 | 12 | 16 ••• | • ••• | 4N |
| ⋮ | ⋮ | | | | | ⋮ |
| y | • | • | • | • ••• | Xy ••• | yN |
| ⋮ | ⋮ | | | | | ⋮ |
| N | N | • | • | • ••• | XN ••• | $N^2$ |

INVENTOR
ROBERT L. FRANK
BY [signature]
ATTORNEY

United States Patent Office 3,099,795

Patented July 30, 1963

3,099,795
PHASE CODED COMMUNICATION SYSTEM

Robert L. Frank, Great Neck, N.Y., assignor to Sperry Rand Corporation, a corporation of Delaware Filed Apr. 3, 1957, Ser. No. 650,534
13 Claims. (Cl. 325—30)

The invention relates generally to radio communication systems and, more specifically, to such systems utilizing discrete phase modulation of the transmitted carrier as a medium for the conveyance of intelligence. The receiver portion of the communication system is suitably arranged, in accordance with a prior knowledge of the nature of the phase modulation, to discriminate in favor of the desired carrier transmission as against all other signals that may be present at the receiver input.

The present application is a continuation-in-part of U.S. patent application Serial No. 588,570, filed on May 31, 1956, in the names of Robert L. Frank and Solomon Zadoff and assigned to the present assignee.

In the aforementioned patent application, radio transmitter and radio receiver apparatus are disclosed which operate, respectively, to transmit predetermined phase modulated and pulsed signals and to receive said signals to the substantial exclusion of all other signals not phase modulated in such predetermined manner. Briefly stated, the disclosed apparatus includes a transmitter which emits a phase coded pulsed signal. Phase coding is defined as involving the shifting of the phase of the transmitted carrier in steps of predetermined amounts of phase shift between successive transmissions, which transmissions may also be pulse modulated. Thus, the transmitter carrier is both amplitude modulated in the form of pulses and phase modulated by the aforementioned shifts in the phase of the carrier.

The receiving apparatus disclosed in the foregoing patent application employs a phase detector having first and second inputs to which are applied, respectively, the received phase coded pulsed signal and a reference signal. The reference signal, locally generated at the receiver, is stepped in phase by amounts identical to the steps in phase of the transmitted carrier. Servos, embodied in the receiver, control the frequency of the reference signal input to the phase detector as well as the stepping of the phase of said reference signal so that the received phase coded signals are tracked both in time and in phase by the reference signal.

In the aforementioned application, an illustrative code is shown for determining the sequence and amounts of phase shift introduced into the transmitter carrier between successive transmitted pulses. For purposes of exemplifying the operation of the system using the illustrated phase code, it was indicated that the receiver phase detection apparatus produces a maximum D.C. output only when the phase coding of the received signal, as applied to a first input to the receiver phase detector, precisely duplicated the phase coding of the reference signal applied to a second input thereto. Lesser amounts of D.C. output are produced under other conditions. In other words, the mere fact that a D.C. output was produced did not unambiguously indicate that the received coded signal and reference coded signal were in phase alignment.

An object of the present invention is to provide a receiver for use in a radio communication system employing a phase coded transmitted signal wherein the received phase coded signal is cross-correlated with a locally generated phase coded signal at the receiver to produce a unique output therefrom only when the two signals are precisely matched in phase.

Another object is to generate phase coded signals which when employed in both the transmitter and receiver of a radio communication system will produce a maximum output from the receiver for the desired transmission and substantially less than said maximum for other received transmissions whether or not phase coded.

Yet another object is to provide a phase coded radio communication system wherein the transmitter carrier is both amplitude modulated in the form of pulses and phase modulated in the form of discrete phase shifts of the transmitted carrier in the time between transmitted pulses wherein the spacing between pulses is periodic over N pulses where N is an integer greater than 1.

Another object is to provide a phase coded radio communication system wherein the transmitter carrier is both amplitude modulated in the form of pulses and phase modulated in the form of discrete phase shifts of the transmitted carrier in the time between transmitted pulses wherein the phase modulation of the pulsed carrier is periodic over $N^2$ pulses where N is an integer greater than 1.

These and other objects of the present invention, as will appear from the following description, are basically accomplished by the provision of a transmitter emitting pulse modulated phase coded signals, and a receiver detection system including a phase detector having first and second inputs. The received signals are applied to a first input of the phase detector and locally generated phase coded signals are applied to the second input thereof. In a preferred embodiment, the output of the phase detector is applied to the signal input of a sampling gate, the control input of which is derived from a local source of pulses, which pulses are adjusted to be separated in time by the same amount separating the transmitted pulses. By proper phasing of the locally generated pulses, the sampling gate is rendered conductive synchronously with the occurrence of the received pulses.

The output of the sampling gate is applied to a low pass filter of conventional design which passes the D.C. output of the sampling gate and substantially rejects all other frequency outputs therefrom. By employing phase coding apparatus in both the transmitter and receiver in accordance with the present invention, an output from the low pass filter is produced only in the case wherein the phase coded received signals as applied to the signal input of the phase detector precisely correspond in phase with the locally generated phase coded signals applied to the reference input thereto.

For a more complete understanding of the present invention, reference should be had to the following description and the appended drawings of which:

Figures 1, 2, 3:
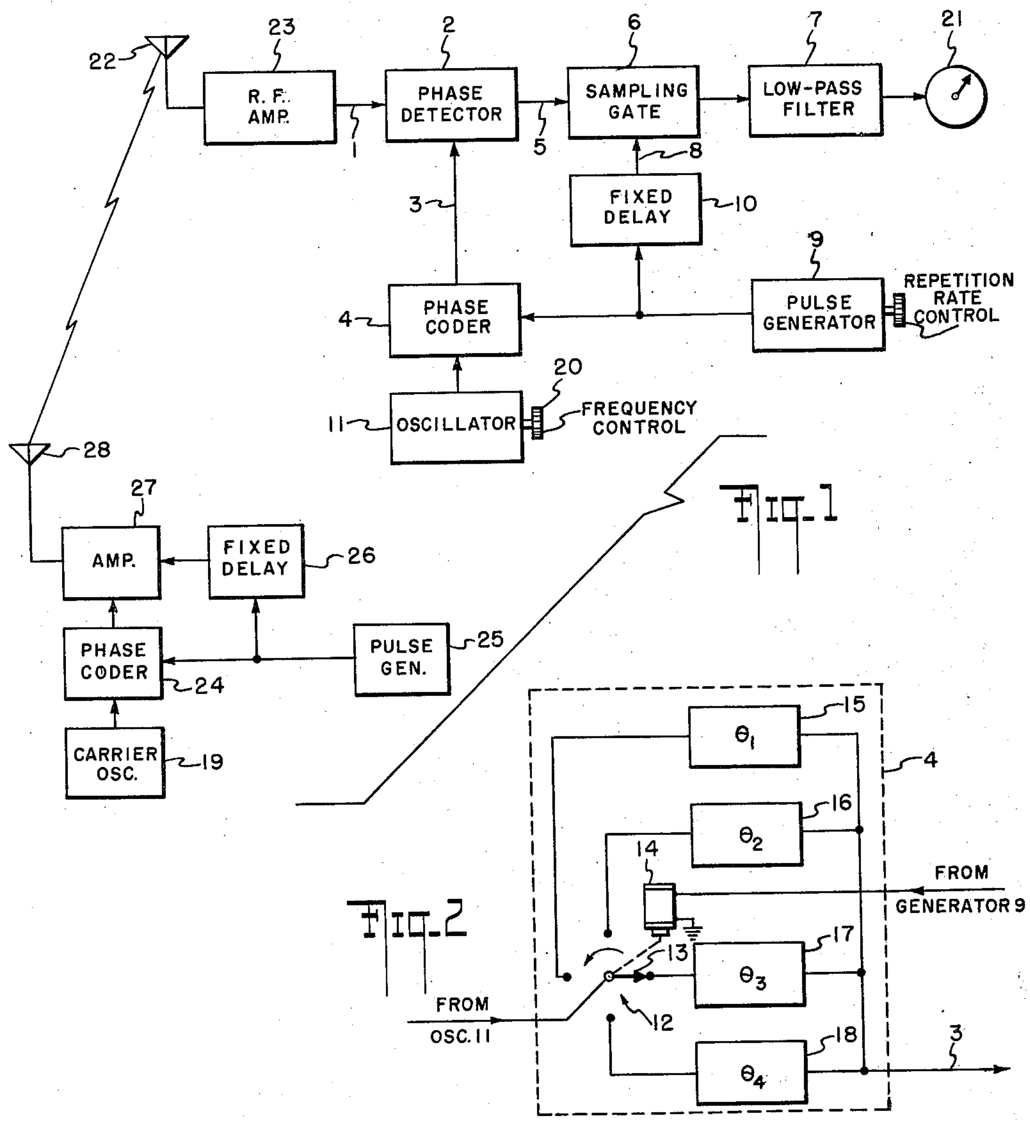
FIG. 1 is a block diagram of a simplified communication system embodying the phase coding apparatus of the present invention in both the transmitter and receiver.
FIG. 2 is a schematic diagram of illustrative phase coding apparatus for use in the system of FIG. 1.
FIG. 3 is a diagrammatic representation in matrix form of the phase coding sequence generated by the structure of FIG. 2.

In FIG. 1, the transmitted signal is received and amplified by antenna 22 and R-F amplifier 23, respectively, and is then applied by conductor 1 to phase detector 2. The second or reference input to phase detector 2 is derived from conductor 3 emanating from phase coder 4. Phase detector 2 may be of a conventional type known in the art which produces an output signal on conductor 5 whose amplitude is substantially determined only by the phase difference between the signal and reference inputs and is maximum when said phase difference is 0° or 180°, and is zero when said phase difference is 90° or 270°.

The output of phase detector 2 is coupled by a conductor 5 to sampling gate 6 which is rendered conductive by gating pulses as applied via conductor 8, which pulses are adjusted to occur in a fixed time relationship with the phase coded pulses at the inputs 1 and 3 of phase detector 2. The gating pulses are produced by a conventional pulse generator 9 adapted to have a variable repetition rate. The output of generator 9 is applied to a control input of phase coder 4 and to fixed delay 10. A signal input to phase coder 4 is generated by variable frequency oscillator 11. The output of sampling gate 6 is applied to low pass filter 7 which is adapted to transmit the D.C. component and to reject the A.C. components of the signals appearing at the output of sampling gate 6. The D.C. component amplitude may be monitored by metal 21.

At the transmitter, the output of carrier oscillator 19, operating at substantially the same frequency as that of receiver oscillator 11, is coupled to the signal input of phase coder 24. The control input to coder 24 is derived from the output of pulse generator 25 which is also coupled via fixed delay 26 to the modulating input of amplitude modulating amplifier 27. The phase coded and amplitude modulated output signal from amplifier 27 is radiated by antenna 28.

Fixed delays 10 and 26 provide the necessary time delay in the receiver and transmitter circuits, respectively, to allow for the phase shifting of the signal outputs of oscillators 11 and 19 in the interval between the occurrence of the transmitted pulses.

FIG. 2 illustrates, for purpose of clarity, a simplified embodiment of the phase coding apparatus of the present invention for use in coders 24 and 4 of FIG. 1. The signal input of phase coder 4, for example, as may be derived from oscillator 11, is applied to the movable arm 13 of a multiposition stepping switch 12. A four position switch is shown by way of example, it being understood that more switch positions may be required for certain species of the present invention as will more fully appear later. Arm 13 is advanced one contact position by means of stepping relay 14 which is energized sequentially by individual pulses as produced by pulse generator 9 of FIG. 1. Each of the contacts of stepping switch 12 is connected to a respective conventional phase shift network 15, 16, 17, and 18. Each of said phase shift networks is adjusted to produce a predetermined amount of phase shift in the oscillator signal as applied to movable arm 13.

The adjustment of phase shift networks 15, 16, 17, and 18 so as to produce respective amounts of phase shift is predicated upon predetermined arithmetic progressions, in accordance with the present invention, as will be described more fully later. Thus, it will be seen that the phase relation between the output signal appearing on conductor 3 and the input signal applied to movable arm 13 is determined by the particular phase shift network to which movable arm 13 is connected at any given time.

The apparatus of FIGS. 1 and 2 so far described corresponds to that disclosed in copending application Serial No. 588,570. In the practice of the present invention, the phase shift networks of phase coder 4 are adjusted to produce predetermined amounts of phase shift each time movable arm 13 of stepping switch 12 is advanced one position. Definite systemic advantages are obtainable in the radio communication system of the present invention when the sequential amounts of phase shift are adjusted to occur in a particular manner.

For convenience, the individual amounts of phase shift produced by phase shift networks, such as shown in FIG. 2, are represented in FIG. 3 by means of a generalized matrix. The matrix, when read from left to right, row by row, represents the time sequence of individual phase coded pulses as produced at the output of a phase coder similar to phase coder 4 of FIG. 2 but having a generalized total of $N^2$ contact positions, each contact position being associated with a respective phase shift network. The numerals 1, 2, 3, 4, . . . of the first row or group are used to indicate that the phase progression of the successive pulses thereof increases by one unit of phase shift. In the second group, it will be observed that the numerals 2, 4, 6, 8, . . . have been employed to indicate a phase progression of two units of phase shift between successive pulses. Similarly, the third and fourth rows indicate phase progression between pulses of three and four units of phase shift, respectively.

The matrix is extended to indicate additional groups that may be employed up to and including the group N. It will be noted that the matrix represents a square, i.e., it is comprised of N columns and N rows so that a total of $N^2$ pulses are represented. Said pulses actually occur sequentially in time, the pulse represented by the numeral 2 of group number 2 next occurring subsequent to pulse N, the pulse represented by the numeral 3 of group number 3 next occurring subsequent to pulse 2N and so on. The total of $N^2$ successive pulses is represented in matrix fashion to facilitate the subsequently appearing mathematical analysis. As was previously mentioned, the present invention contemplates the production of phase coded pulses wherein the spacing between pulses is periodic over N pulses and wherein the entire phase modulation process is periodic over $N^2$ pulses. In other words, assuming, for example, that a repetitive series of four pulses represented by a matrix (wherein $N=2$ and $N^2=4$) of two groups of two pulses each are transmitted, the fifth pulse will be of the same phase as the first pulse, while the sixth pulse will have the same phase as the second pulse, and so on. Such a repetitive succession of four pulses is producible by the coder embodiment of FIG. 2. Similarly, in another species of the present invention wherein a repetitive series of 64 pulses represented by a matrix (wherein $N=8$ and $N^2=64$) of eight groups of eight pulses each are transmitted, the 65th pulse will be of the same phase as the first pulse while the 66th pulse will have the same phase as the second pulse, and so on.

For purposes of explanation, the angle $\theta_{xy}$ is designated as the angle representing the phase of any given pulse contained in the matrix of FIG. 3, relative to the phase of some arbitrary continuous wave signal of the same frequency. Thus, $\theta_{xy}$ represents the phase of the $x$th pulse in the $y$th group of $N^2$ pulses, with respect to the phase of said arbitrary continuous wave signal. By further definition, a unit of phase is designated by $2\pi p/N$ radians. In conformance with the foregoing definitions, the basic unit of phase code of the present invention is designated by the expression $$\theta_{xy}=\frac{2p\pi xy}{N}$$

radians, where $x$ and $y$ take on the values of 1, 2, 3, . . . N. The significance of the expression $2\pi p/N$ will appear later.

In an illustrative application of the apparatus of the present invention, it may be desirable to make the output of oscillator 11 phase coherent with the carrier of the phase coded transmitted signals. As previously mentioned, the particular phase code employed at the transmitter is known in advance at the receiver so that the output of the phase coder 4 of the receiver is a signal having the same phase progression as that of the transmitted signal. Thus, the transmitter and the receiver will both employ equivalent phase coders.

Despite the fact that the output of receiver phase coder 4 already duplicates the phase progression of the phase coded transmitted signal, the problem remains to synchronize the operation of the receiver phase coder 4 with that of the transmitter phase coder so that the individual phase coded signal outputs therefrom may be brought into mutual phase coherence at the respective inputs to detector 2. It will be recognized that when such phase coherence is achieved between the phase coded signals, then the aforementioned desired establishment of phase coherence between oscillators 11 and 19 is accomplished. In this case, the phase coding of the transmitted signals may be considered to be a medium for the discriminatory remote reception of information respecting the phase of the carrier signal generated by oscillator 19. Assuming that oscillator 19 is being employed as a highly accurate timing standard, it follows that the accuracy thereof may be imparted to a remotely located secondary timing standard such as oscillator 11 upon the establishment of phase coherence between oscillators 19 and 11. The attainment of phase coherence between the primary timing standard (oscillator 19) and the remotely located secondary timing standard (oscillator 11) is unambiguously evidenced by the actuation of meter 21.

The actuation of meter 21 is also indicative of coherence between oscillators 25 and 9 as well as the precise synchronization of phase coders 24 and 4. Said synchronization signifies, in terms of the electromechanical coder embodiment shown in FIG. 2, that the arm 13 of the stepping switch 12 used in transmitter coder 24 is "in step" with the arm of the corresponding stepping switch used in receiver coder 4. Thus, the actuation of meter 21 indicates that the three receiver timing devices (oscillator 11, generator 9, and coder 4) are each coherently operative with a respective one of the corresponding three transmitter timing devices (oscillator 19, generator 25 and coder 24). Oscillator 11, generator 9 and coder 4 may be considered as being fine, medium and coarse time repeaters which make available at a remote receiver all the precise timing data generated within the transmitter.

One of the more important signal discrimination features of the present invention is that no D.C. signal is produced at the output of low pass filter 7 for the actuation of meter 21 unless the phase progression of the signal as applied via conductor 3 to phase detector 2 precisely matches that of the signal applied thereto via conductor 1.

This desirable feature is susceptible to the following proof. The phase of any particular pulse *xy* is designated by the expression $$\theta_{xy}=\frac{2p\pi xy}{N}$$

radians. To make the expression more general, the quantity $\beta_x$ is added to represent the addition of an arbitrary constant angle $\beta$ to that of the members of each column or equivalently to every $N^{th}$ pulse. Thus, with the addition of this constant, the general term of the basic matrix becomes $$\theta_{xy}=\frac{2p\pi xy}{N}\text{ radians}+\beta_x \qquad (1)$$

The well-known operation of the phase detector of FIG. 1 is such as to produce an output signal proportional to a function of the applied signal and reference carrier wave amplitudes multiplied by the cosine of the phase angle between said signal and reference carrier waves. Thus, if $S(t)$ is the signal amplitude, $R(t)$ the reference amplitude, and $\psi(t)$ the phase angle between said signal and reference waves, the output from the phase detector is $F[S(t), R(t)] \cos \psi(t)$. Inasmuch as S and R have the same periodicity and since the output of the phase detector is sampled (as by means of sampling gate 6) at that same periodicity, then the sampled output is such that F(S, R) is constant for all samples and only varies in accordance with $\cos \psi(t)$.

It will now be shown that if all the samples are averaged over the total of $N^2$ pulses, then the average output from sampling gate 6 is zero (no D.C. component) for all but one possible phase alignment of the reference and signal waves, provided that the reference and signal waves are phase modulated in accordance with the same matrix of FIG. 3.

It will be assumed that the phase angle of the signal carrier wave at the times of successive operation of sampling gate 6 is described by the sequence $\theta_1, \theta_2, \ldots \theta_k, \ldots \theta_{N^2}$ with respect to an arbitrary continuous wave carrier signal. Furthermore, it will be assumed that the reference phase angle at these times follows the sequence $\phi_1, \phi_2, \ldots \phi_k, \ldots \phi_{N^2}$ with respect to the same carrier. The average of the samples is then proportional to the summation $$\frac{1}{N^2}\sum_{k=1}^{N^2}\cos(\theta_k-\phi_k) \qquad (2)$$

where $N^2$ is the number of samples averaged. If the average over $N^2$ samples is zero and the signals are periodic (as previously defined) with period $N^2$, then the average over $2N^2, 3N^2, \ldots$ will also be zero and will approach zero for any number of samples which are much greater than $N^2$.

It should be noted that if the function $$\frac{1}{N^2}\sum_{k=1}^{N^2}\epsilon^{i(\theta_k-\phi_k)}=0 \text{ where } i=\sqrt{-1} \qquad (3)$$

then the individual real and imaginary component functions of the equivalent expression $$\frac{1}{N^2}\sum_{k=1}^{N^2}\cos(\theta_k-\phi_k)+i\frac{1}{N^2}\sum_{k=1}^{N^2}\sin(\theta_k-\phi_k) \text{ both equal zer}$$

For the reason that the exponential summation is generally easier to handle from a mathematical point-of-view than the equivalent trigonometrical summation, the exponential summation will be used for purposes of demonstrating that the real component as described by Equation 2 of the function designated by Equation 3 is equal to zero when the total function described by Equation 3 is equal to zero.

In averaging the samples for purposes of proving that the summation indicated by Equation 3 equals zero for all cases excepting the one wherein the phase progression of the two signals applied to phase detector 2 is precisely the same, the summation need not be made in any particular group or column order. It is only material that all the samples indicated by the summation of Equation 3 be taken into account.

In the code matrix of FIG. 3, $$\theta_{xy}+\beta_x=\frac{2\pi pxy}{N}+\beta_x$$

is the angle of the signal. Now let $$\phi_{xy}=\frac{2\pi pxy}{N}+\beta_x+\alpha$$

be the angle for the reference where $x, y=1, 2 \ldots N$ and $\alpha$ represents an arbitrary fixed phase angle. When the received signal and reference codes are aligned, that is, the signal and reference codes are in step row by row and column by column at the aforementioned sample times, the sum of the samples is $$\sum_{x,y}\epsilon^{i\left(\frac{2\pi pxy}{N}-\frac{2\pi pxy}{N}+\beta_x-\beta_x-\alpha\right)}=\epsilon^{-i\alpha}\sum_{x,y}1 \qquad (4)$$

Since there are $N^2$ samples, the sum is $N^2\epsilon^{-i\alpha}$ and the real part of the average over $N^2$ samples is simply the real part of $\epsilon^{-i\alpha}$ or $\cos \alpha$. If the matrices are misaligned, i.e., the phase code of the reference is out of step with that of the signal, then the reference code may be written as $$\phi_{xy}=\frac{2\pi p}{N}(y-Q)(x-R)+\alpha+\beta_{(x-R)} \qquad (5)$$

where Q is the number of rows misaligned and R is the number of columns misaligned.

In the following mathematical development, row misalignment and column misalignment of the signal and reference phase codes will be separately considered. If there is no column misalignment ($R=0$) but if the rows of the matrix of FIG. 3 corresponding to the received signal are misaligned by an amount Q, where $0<Q<N$, with the rows of the matrix corresponding to the reference signal input to phase detector 2 of FIG. 1, then Equation 5 becomes $$\phi_{xy}=\frac{2\pi p}{N}(y-Q)x+\alpha+\beta_x$$

Taking the sum of the samples there results $$\sum_{x,y}\epsilon^{\frac{i2\pi pxy}{N}+\beta_x-\frac{2\pi p(y-Q)}{N}x-\alpha-\beta_x}$$

which when rearranged and simplified, $$=\epsilon^{-i\alpha}\sum_{x=1}^{N}\sum_{y=1}^{N}\epsilon^{\frac{i2\pi pyQ}{N}} \tag{6}$$

By reference to a standard algebra text, for example, R. Brink, College Algebra, D. Appleton Century Company, New York, 1933, page 215, it can be seen that the indicated sum over $y$ is the sum of a geometric progression whose value is $$\frac{\epsilon^{\frac{i2\pi pQ}{N}}\left(1-\epsilon^{\frac{i2\pi pQN}{N}}\right)}{1-\epsilon^{\frac{i\pi 2pQ}{N}}} \tag{7}$$

It will be observed that if the value of the function as represented by Equation 7 is proven equal to zero, then the value of the Expression 6 must be equal to zero. This in turn would prove that no D.C. output is produced from filter 7 in the event that there is no column misalignment but that there is a row misalignment Q, where $0<Q<N$, between the matrix corresponding to the received signal and the matrix corresponding to the reference signal, as applied, respectively, to conductors 1 and 3 at the inputs of phase detector 2 of FIG. 1. The value of Expression 7 can be proven equal to zero if it can be shown that the numerator thereof equals zero at the same time that the denominator thereof has a value other than zero.

It was previously defined that the basic unit of the phase code of the present invention is equal to $$\theta_{xy}=\frac{2\pi p}{N}$$

radians. According to the present invention, $$\epsilon^{\frac{i2\pi p}{N}}$$

is a primitive $N^{th}$ root of unity, that is, there is no integer Q greater than zero and less than N whereby $$\epsilon^{\frac{i2\pi pQ}{N}}$$

In other words, $$\epsilon^{\frac{i2\pi pQ}{N}}\neq 1 \tag{8}$$

if $0<Q<N$.

Values of $p$ may now be determined with respect to values of N, whereby N, as previously defined, represents the number of pulses over which the spacing therebetween is periodic.

According to the present invention, the value $p$ is defined as being relatively prime to the value of N. That is, there are no integers $a$ and $b$ both of which are less than N such that $ap=bN$. As an example, if $N=8$, then $$\frac{b}{a}=\frac{p}{8}$$

Thus, $p$ may equal 1 or 3 or 5, etc., any one of which values will satisfy the requirement of the present invention.

Returning to the Expression 7, the factor in the denominator $$\epsilon^{\frac{i2\pi pQ}{N}}\neq 1$$

as indicated in Equation 8. Thus, the entire denominator $$1-\epsilon^{\frac{i2\pi pQ}{N}}\neq 0$$

As to the factor $$\epsilon^{\frac{i2\pi pQN}{N}}$$

in the numerator of (7), inasmuch as $$\epsilon^{\frac{i2\pi p}{N}}$$

was previously defined as the primitive $N^{th}$ root of unity, it is obvious that this quantity raised to the $N^{th}$ power equals unity. Moreover, since Q must be an integer, it is clear that the direction of the polar vector $$\epsilon^{\frac{i2\pi pN}{N}}$$

is unaffected by rotating it through an integral number of $2\pi$ radians as is accomplished by multiplying the exponent by Q. Thus, $$\epsilon^{\frac{i2\pi pQN}{N}}$$

will still equal unity and the quantity $$1-\epsilon^{\frac{i2\pi pQN}{N}}=0$$

causing the entire Expression 7 to equal zero.

Assuming that there is both row misalignment Q where $0\leqslant Q\leqslant N$ and column misalignment R where $0<R<N$, between the matrix corresponding to the received signal and the matrix corresponding to the reference signal input to phase detector 2 of FIG. 1, then the reference code may be written as $$\phi_{xy}=\frac{2\pi p}{N}(y-Q)(x-R)+\alpha+\beta_{(x-R)}$$

The sum of the samples is equal to $$\sum_{x,y}\epsilon^{\left\{\frac{i2\pi pxy}{N}+\beta_x-\frac{2\pi p}{N}(y-Q)(x-R)-\alpha-\beta_{(x-R)}\right\}}$$

which, when rearranged and simplified $$=\epsilon^{-i\alpha-\frac{i2\pi pQR}{N}}\sum_{x=1}^{N}\epsilon^{i\left\{\beta_x-\beta_{(x-R)}+\frac{2\pi pQx}{N}\right\}}\sum_{y=1}^{N}\epsilon^{\frac{i2\pi pRy}{N}} \tag{9}$$

However, the indicated sum over y, where $0<R<N$, is again the sum of a geometric progression whose value is $$\frac{\epsilon^{\frac{i2\pi pR}{N}}\left(1-\epsilon^{\frac{i2\pi pRN}{N}}\right)}{1-\epsilon^{\frac{i2\pi pR}{N}}}=0$$

as in the previously investigated instance of row misalignment but no column misalingment.

To summarize, it has been shown that no D.C. output is produced from the receiver phase detector of the present invention when the matrices defining the phase code of the received signal and reference signal inputs thereto have (1) no column misalignment but row misalignment; (2) both column and row misalignment.

A third possible situation, wherein the matrices have column misalignment but no row misalignment, also produces no D.C. output from the receiver phase detector as may be seen by inspection of Equation 9. In Equation 9, the multiplying function $$\sum_{y=1}^{N} \epsilon^{\frac{i2\pi pRy}{N}}$$

contains no factor Q where Q represents the amount of row misalignment. Thus, irrespective of row alignment or misalignment, said function reduces to 0 and the total value of Equation 9 likewise goes to 0. In other words, no D.C. output is produced in the event that the matrices defining the received signal and reference signal inputs to the receiver phase detector have column misalignment but no row misalignment.

From the preceding mathematical proofs it can be seen that in order to produce a signal having a D.C. component at the output of low pass filter 7, it is required that the signal and reference inputs of phase detector 2, as respectively applied via conductors 1 and 3, are in precise time and phase coherence. The required coherence may be attained by first adjusting local oscillator 11 to the known frequency of transmitter oscillator 19. Generator 9 is then adjusted to a frequency slightly different from the known frequency of generator 25 which causes the stepping rate of coder 4 to be somewhat different from the stepping rate of coder 24. In due course, because of the different stepping rates, arm 13 of coder 4 will be brought into alignment with the corresponding arm of coder 24. This alignment will be evidenced by deflection of meter 21. As soon as deflection is observed, the repetition rate of generator 9 is immediately adjusted to the known repetition rate of generator 25 to maintain synchronization of the coder arms. Finally, control 20 is momentarily adjusted so as to properly phase oscillator 11 to produce a maximum deflection on meter 21. At this point complete synchronization is achieved with the result that oscillator 11, generator 9 and coder 4 are precisely and unambiguously synchronized with oscillator 19, generator 25 and coder 24.

An important feature of the present invention is that uncoded signals, i.e., undesired signals that may be applied to phase detector 2 via conductor 1, will produce a D.C. output from filter 7 whose maximum amplitude will not exceed 1/N of that maximum amplitude which will be produced by the desired phase coded transmission. By reference to the matrix of FIG. 3, let it be assumed, for example, that 64 pulses are transmitted, each eight pulses of which comprises an independent group having its own arithmetic phase progression. As measured relative to an arbitrary continuous wave uncoded signal, each pulse of a given group will lag, for example, the phase of the arbitrary reference signal by succeeding amounts which increase in an arithmetic fashion.

It follows that phase coherence is not maintained between the coded signal and the uncoded continuous wave signal. However, in order to restore phase coherence therebetween, it is not necessary that the phase of the uncoded signal be changed in discrete steps synchronously with the discrete phase changes of the coded signal. Alternatively, and inasmuch as the phase of the coded signal is changed during the time interval between pulses of the coded signal, the phase of the uncoded signal may be continuously varied so that during the interval of the pulses of the coded signal, the phase of the uncoded signal is substantially the same as that of the coded signal. As is well known in the art, a continuous rate of change of phase with respect to time is equivalent to a frequency shift. In other words, then, the phase of an uncoded signal may be made substantially coherent with that of the coded signal by the simple expedient of changing the frequency of the uncoded signal so that during the interval of the pulses of the coded signal, the phase of the uncoded signal substantially matches that of the coded signal.

Returning to the example of phase coded references as represented by a matrix of 8 groups of 8 pulses, an uncoded signal may be made substantially coherent with any one of said groups of said phase coded signals by merely shifting the frequency of the uncoded signal. Assuming, for example, that an uncoded signal as may be applied via conductor 1 to phase detector 2 is so adjusted in frequency that its phase is made coherent to that of one of the groups of the reference phase coded signals as may be applied via conductor 3 to phase detector 2, a D.C. signal will be produced at the output of filter 7 each time that particular group of phase coded signals is applied via conductor 3 to phase detector 2. Inasmuch as there are 8 groups of 8 pulses, said D.C. output will be produced only once per 8 groups of 8 pulses.

It is well understood in the phase detector art that no D.C. output will be produced from a phase detector when the signal and reference inputs thereto are in phase quadrature. A maximum output will be produced, on the other hand, when said two signals are in phase. Therefore, the maximum D.C. signal that can be produced at the output of filter 7 as a result of the appearance of a continuous wave uncoded signal on conductor 1, assuming the phase of said uncoded signal to be substantially coherent with the phase of a predetermined one of the 8 groups of phase coded pulses as applied via conductor 3, will be 1/8, i.e., 1/N, that which would be produced if said uncoded signal were phase coherent with each one of the 8 groups of said phase coded pulses. In summary, where N groups of N phase coded pulses are applied via conductor 3 to phase detector 2, the maximum D.C. output signal from filter 7 in response to a single uncoded signal input via conductor 1 will be 1/N of the maximum output that would be produced were the desired phase coded signal applied via conductor 1 in lieu thereof.

From an interference rejection point-of-view, the receiver of the present invention, utilizing N groups of N phase coded pulses as a locally generated reference signal, will produce a maximum response of unity to a phase coded signal following the same phase and phase progression as that of the locally generated signal. The maximum output from the receiver of the present invention, on the other hand, will be 1/N of said unity output in the event that an uncoded continuous wave signal is applied via conductor 1 rather than the desired phase coded signal.

It can be seen from the preceding description that the objects of the present invention have been achieved by the provision of phase coding apparatus at a transmitter for generating phase coded pulsed transmissions and equivalent phase coding apparatus at a remote receiver capable of precisely reproducing the phase coded signals generated by the transmitter. The receiver of the present invention includes a phase detector to which are applied the locally generated phase coded signals and the received signals. The output of the receiver phase detector is applied to a low pass filter for passing a D.C. signal component and for substantially rejecting all other components whereby a maximum D.C. output is produced from the filter only when the desired phase coded signal is received and the received phase coded signal is precisely phase coherent with the locally generated phase signal. The D.C. signal output produced from the filter included in the receiver of the present invention cannot exceed 1/N that of the maximum amplitude in the event that an uncoded continuous wave signal is received rather than the desired phase coded signal.

The unique output (maximum D.C.) produced by the receiver of the present invention and the lesser output (1/N maximum) in response to desired phase coded signals and uncoded continuous wave signals, respectively, are made possible by the adjustment of the transmitter and receiver phase coder parameters so as to produce a sequence of phase shifted signals having a basic phase of $2\pi p/N$, where $p$ is relatively prime to N so that $$\epsilon^{\frac{i2\pi p}{N}}$$

is a primitive $N^{th}$ root of unity whose phase progression may be represented by a matrix of N rows and N columns wherein discrete predetermined arithmetic progressions are represented at least by the respective columns and wherein the spacing between pulses is periodic over N pulses and the phase sequence of the pulsed carrier is periodic over $N^2$ pulses where N is an integer greater than 1.

It should be observed that the present invention encompasses within its scope the provision of phase coding apparatus both at the transmitter and receiver, which produces a continuous stream of equally spaced pulses or, alternatively, a plurality of discrete series of equally spaced pulses, that is, the only requirement of the present invention is that the spacing between each successive pulse series is made equal. The time spacing between successive series of pulses may be made equal to the spacing between the pulses comprising each series.

Moreover, it should be noted that any arbitrary permutation of the columns of the basic code matrix of FIG. 3 will produce another code matrix which has essentially the same properties as the matrix of FIG. 3 insofar as they affect the D.C. output of the phase detector of FIG. 1.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A radio communication system including a transmitter for producing carrier phase coded pulsed transmissions and a receiver adapted to receive said transmissions and operative to produce a unique output in response thereto as against all other received signals, said transmitter including a first source of carrier signal, a first source of pulses, a first phase coder connected to both said first sources and adapted to receive said carrier signal and said pulses to produce therefrom N first series of carrier signals, each series being comprised of N phase modulated carrier signals where N is an integer greater than 1, the carrier phase value of each signal of said first series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, pulse delay means coupled to the output of said first source of pulses, means coupled to said first phase coder and to said pulse delay means for amplitude modulating the signal output of said first phase coder with the signal output of said pulse delay means, and means connected to the modulating means for transmitting the output of said modulating means; said receiver including a second source of carrier signal, a second source of pulses, a second phase coder connected to both said second sources for producing N second series of phase coded carrier signals having substantially the same carrier phase characteristic as said first series, a phase detector having first and second inputs, means for receiving said transmitted transmissions, means for applying the received transmissions to said first input, means for applying said second series of signals to said second input, signal utilization means, and a low pass filter connected between said phase detector and said utilization means for coupling the output of said phase detector to said utilization means.

2. A radio communication system including a transmitter for producing phase coded carrier transmissions and a receiver adapted to receive said transmissions and operative to produce a unique output in response thereto as against all other received signals, said transmitter including a first source of carrier signal, a first source of pulses, a first phase coder connected to both said first sources and adapted to receive said carrier signal and said pulses to produce therefrom N first series of carrier signals, each series being comprised of N phase modulated carrier signals where N is an integer greater than 1, the carrier phase value of each signal of said first series, relative to the phase value of an arbitrary continuous wave signal being definable in terms of a matrix of N rows and N columns, said matrix defining a total of $N^2$ phase values over which total the phase values are periodic and wherein the phase values in each column of said matrix follow a different arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, and means connected to said first phase coder for transmitting the output of said first phase coder; said receiver including a second source of carrier signals having substantially the same frequency as that of said first source of carrier signal, a second source of pulses, a second phase coder connected to both said second sources for producing N second series of phase coded carrier signals having substantially the same carrier phase characteristics as said first series, a phase detector having first and second inputs, means for receiving said transmissions, means for applying the received transmissions to said first input, means for applying said second series of signals to said second input, signal utilization means, and a low pass filter connected between said phase detector and said utilization means for coupling the output of said phase detector to said utilization means.

3. A radio communication system including a transmitter for producing carrier phase coded pulsed transmissions and a receiver adapted to receive said transmissions and operative to produce a unique output in response thereto as against all other received signals, said transmitter including a first source of carrier signal, a first source of pulses, a first phase coder connected to both said first sources and adapted to receive said carrier signal and said pulses to produce therefrom N first series of carrier signals, each series being comprised of N phase modulated carrier signals where N is an integer greater than 1, the characteristic carrier phase value of each signal of said first series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, pulse delay means coupled to the output of said first source of pulses, means connected to said first phase coder and to said pulse delay means for amplitude modulating the signal output of said first phase coder with the signal output of said pulse delay means, and means connected to the modulating means for transmitting the output of said modulating means; said receiver including means for receiving said transmissions, demodulating means having a phase response characteristic substantially defined by said matrix for cross-correlating the characteristic carrier phase values of the received transmissions with said response characteristic, means connected between said means for receiving and said demodulating means for coupling the output of said means for receiving to the input of said demodulating means signal utilization means, and a low pass filter connected between said demodulating means and said utilization means for coupling the output of said demodulating means to said utilization means.

4. A radio communication system including a transmitter for producing phase coded carrier transmissions and a receiver adapted to receive said transmissions and operative to produce a unique output in response thereto as against all other received signals, said transmitter including a first source of carrier signal, a first source of pulses, a first phase coder connected to both said first sources and adapted to receive said carrier signal and said pulses to produce therefrom N first series of carrier signals, each series being comprised of N phase modulated carrier signals where N is an integer greater than 1, the characteristic carrier phase value of each signal of said first series, relative to the phase value of an arbitrary continuous wave signal, being definable in terms of a matrix of N rows and N columns, said matrix defining a total of $N^2$ phase values over which total the phase values are periodic, and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, and means connected to said first phase coder for transmitting the output of said first phase coder; said receiver including means for receiving said transmissions, demodulating means having a phase response characteristic substantially defined by said matrix for cross-correlating the characteristic carrier phase values of the received phase coded transmissions with said response characteristic, means connected between said means for receiving and said demodulating means for coupling the output of said means for receiving to the input of said demodulating means, signal utilization means, and a low pass filter connected between said demodulating means and said utilization means for coupling the output of said demodulating means to said utilization means.

5. In a signal communication system, a transmitter comprising a source of carrier signal, a source of pulses, a phase coder connected to both said sources and adapted to receive said carrier signal and said pulses to produce therefrom N series of carrier signals, each series being comprised of N phase modulated carrier signals where N is an integer greater than 1, the carrier phase value of each signal of said series, relative to the phase value of an arbitrary continuous wave signal, being definable in terms of a matrix of N rows and N columns, said matrix defining a total of $N^2$ phase values over which total the phase values are periodic, and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, pulse delay means coupled to the output of said source of pulses, means connected to said phase coder and said pulse delay means for amplitude modulating the signal output of said phase coder with the signal output of said pulse delay means, and means connected to said modulating means for transmitting the output of said modulating means.

6. In a signal communication system, a transmitter comprising a source of carrier signal, a source of pulses, a phase coder connected to both said sources and adapted to receive said carrier signal and said pulses to produce therefrom N series of carrier signals, each series being comprised of N phase modulated carrier signals where N is an integer greater than 1, the carrier phase value of each signal of said series, relative to the phase value of an arbitrary continuous wave signal, being definable in terms of a matrix or N rows and N columns, said matrix defining a total of $N^2$ phase values over which total the phase values are periodic and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, and means connected to said phase coder for transmitting the output of said phase coder.

7. In a radio communication system utilizing phase coded pulsed carrier transmissions, a receiver adapted to receive said transmissions and operative to produce a unique output in response thereto as against all other received signals, said receiver comprising a source of local carrier signal having substantially the same frequency as that of the carrier of said transmissions, a source of local pulses having substantially the same repetition rate as that of the pulses of said transmissions, a phase coder connected to both said sources and adapted to receive said local carrier signal and said local pulses to produce therefrom N series of carrier signals having substantially the same carrier phase characteristic as that of said phase coded pulsed carrier transmissions, each series being comprised of N phase modulated carrier signals where N is an integer greater than 1, the carrier phase value of each signal of said series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a phase value of $2\pi p/N$ where $p$ is an integer relatively prime to N so that $$\epsilon^{\frac{i2\pi p}{N}}$$

is a primitive $N^{th}$ root of unity, means for receiving said pulsed carrier transmissions, a phase detector having first and second inputs, means connected to said phase coder and to said phase detector for coupling the output of said phase coder to said first input, means connected to said means for receiving and to said phase detector for coupling the output of said means for receiving to said second input, signal utilization means, and a low pass filter connected between said phase detector and said utilization means for coupling the output of said phase detector to said utilization means.

8. In a radio communication system utilizing phase coded pulsed carrier transmissions, a receiver adapted to receive said transmissions and operative to produce a unique output in response thereto as against all other received signals, said receiver comprising a source of local carrier signal having substantially the same frequency as that of the carrier of said transmissions, a source of local pulses having substantially the same repetition rate as that of the pulses of said transmissions, a phase coder connected to both said sources and adapted to receive said local carrier signal and said local pulses to produce therefrom N series of carrier signals having substantially the same carrier phase characteristic as that of said phase coded pulsed carrier transmissions, each series being comprised of N phase modulated carrier signals where N is an integer greater than 1, the carrier phase values of each signal of said series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a phase value of $2\pi p/N$ where $p$ is an integer relatively prime to N so that $$\epsilon^{\frac{i2\pi p}{N}}$$

is a primitive $N^{th}$ root of unity, means for receiving said pulsed carrier transmissions, a phase detector having first and second inputs, means connected to said phase coder and to said phase detector for coupling the output of said phase coder to said first input, means connected to said means for receiving and to said phase detector for coupling the output of said means for receiving to said second input, pulse delay means connected to the output of said source of local pulses, pulse sampling means coupled to the output of said phase detector and to said pulse delay means and adapted to be rendered conductive by the pulse output of said pulse delay means, signal utilization means, and a low pass filter connected between said sampling means and said utilization means for coupling the output of said sampling means to said utilization means.

9. In a radio communication system utilizing phase coded pulsed carrier transmissions, said transmissions being comprised of N series of carrier signals, each series being comprised of N phase modulated carrier signals where N is an integer greater than 1, the characteristic carrier phase value of each signal of said series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a phase value of $2\pi p/N$ where $p$ is an integer relatively prime to N so that $$\epsilon^{\frac{i2\pi p}{N}}$$

is a primitive $N^{th}$ root of unity, a receiver comprising means for receiving said phase coded pulsed transmissions, demodulating means having a phase response characteristic substantially defined by said matrix for cross-correlating the characteristic carrier phase values of the received phase coded carrier transmissions with said response characteristic, means connected to said means for receiving and to said demodulating means for coupling the output of said means for receiving to the input of said demodulating means, signal utilization means, and a low pass filter connected between said demodulating means and said utilization means for coupling the output of said demodulating means to said utilization means.

10. Means for generating phase coded pulsed carrier signals comprising a source of carrier signal, a source of pulses, a phase coder connected to both said sources and adapted to receive said carrier signal and said pulses to produce therefrom N series of carrier signals, each series being comprised of N phase modulated carrier signals where N is an integer greater than 1, the carrier phase value of each signal of said series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity, pulse delay means coupled to the output of said source of pulses, and means connected to said phase coder and to said pulse delay means for amplitude modulating the signal output of said phase coder with the signal output of pulse delay means.

11. Means for generating phase coded carrier signals comprising a source of carrier signal, a source of pulses, and a phase coder connected to both said sources and adapted to receive said carrier signal and said pulses to produce therefrom N series of carrier signals, each series being comprised of N phase modulated carrier signals where N is an integer greater than 1, the carrier phase value of each signal of said series, relative to the phase value of an arbitrary continuous wave signal, being definable in terms of a matrix of N rows and N columns, said matrix defining a total of $N^2$ phase values over which total the phase values are periodic and wherein the phase values in each column of said matrix follow a different arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity.

12. A detector adapted to receive phase coded pulsed carrier signals and operative to produce a D.C. output in response thereto, said phase coded pulsed carrier transmissions comprising N first series of carrier signals, each said series being comprised of N phase modulated carrier signals where N is an integer greater than 1, the carrier phase value of each signal of said series, relative to the phase value of an arbitrary continuous wave signal being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity; said detector comprising a source of local carrier signals, a source of local pulses, a phase coder connected to both said sources for producing N second series of phase coded carrier signals having substantially the same carrier phase characteristic as said first series, a phase detector having first and second inputs, means for applying said first series of phase coded pulsed carrier signals to said first input, means connected to said phase coder and to said phase detector for applying said second series of signals to said second input, and a low pass filter connected to the output of said phase detector.

13. A detector adapted to receive phase coded pulsed carrier signals and operative to produce a D.C. output in response thereto, said phase coded pulsed carrier transmissions comprising N first series of carrier signals, each said series being comprised of N phase modulated carrier signals where N is an integer greater than 1, the carrier phase value of each signal of said series, relative to the phase value of an arbitrary continuous wave signal being definable in terms of a matrix of N rows and N columns, said matrix defining a total of $N^2$ phase values over which total the phase values are periodic and wherein the phase values in each column of said matrix follow a distinctive arithmetic progression, each signal represented by said matrix having a basic phase value of $2\pi p/N$ where $p$ is an integer relatively prime to N so that $$\epsilon^{\frac{i2\pi p}{N}}$$

is a primitive $N^{th}$ root of unity; said detector comprising a source of local carrier signals, a source of local pulses, and a phase coder connected to both said sources and for producing N second series of phase coded carrier signals having substantially the same carrier phase characteristic as said first series, a phase detector having first and second inputs, means connected to said phase coder and to said detector for applying said first series of phase coded pulsed carrier signals to said first input, means connected to said phase coder and to said phase detector for applying said second series of signals to said second input, pulse delay means connected to the output of said source of local pulses, pulse sampling means coupled to the output of said phase detector and to said pulse delay means and adapted to be rendered conductive by the pulse output of said pulse delay means, and a low pass filter connected to the output of said sampling means.

References Cited in the file of this patent

UNITED STATES PATENTS

| | | |
|---|---|---|
| 1,463,994 | Hammond | Aug. 7, 1923 |
| 2,312,897 | Guanella et al. | Mar. 2, 1943 |
| 2,408,692 | Shore | Oct. 1, 1946 |
| 2,534,535 | Smith et al. | Dec. 19, 1950 |
| 2,580,148 | Wirkler | Dec. 25, 1951 |
| 2,643,819 | Lee et al. | June 30, 1953 |
| 2,718,638 | De Rosa et al. | Sept. 20, 1955 |